(No Model.) 8 Sheets—Sheet 1.

J. CAUDERAY.
ELECTRIC METER.

No. 434,501. Patented Aug. 19, 1890.

Witnesses:
James F. Duhamel
Horace A. Dodge.

Inventor:
Jules Cauderay,
by Dodge Sons,
Attys.

(No Model.) 8 Sheets—Sheet 3.

J. CAUDERAY.
ELECTRIC METER.

No. 434,501. Patented Aug. 19, 1890.

Witnesses.
James F. Duhamel
Horace A. Dodge.

Inventor:
Jules Cauderay,
by Dodge & Son
Attys.

(No Model.)
8 Sheets—Sheet 4.
J. CAUDERAY.
ELECTRIC METER.
No. 434,501. Patented Aug. 19, 1890.
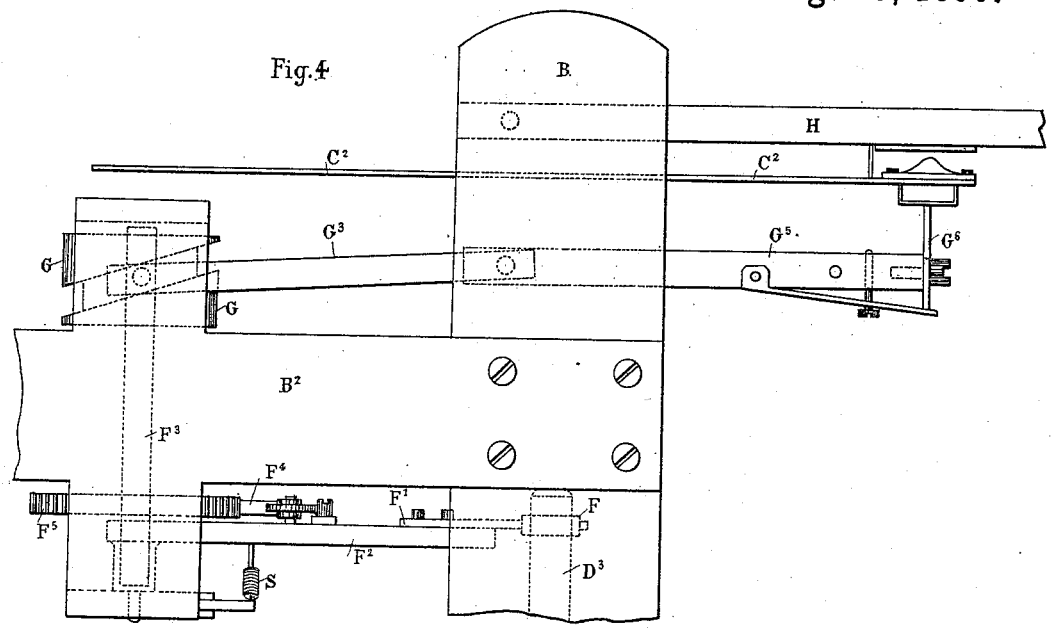
Fig. 4
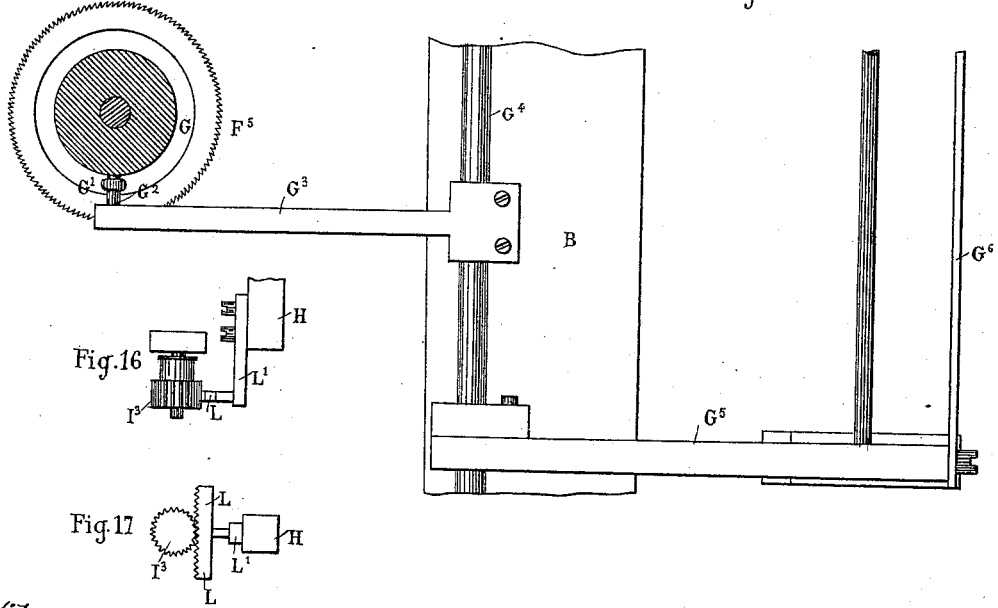
Fig. 5.
Fig. 16
Fig. 17
Witnesses:
James F. Duhamel
Horace A. Dodge
Inventor:
Jules Cauderay
by Dodge & Sons,
Attys.
THE NORRIS PETERS CO., PHOTO-LITHO., WASHINGTON, D. C.

(No Model.) 8 Sheets—Sheet 5.

J. CAUDERAY.
ELECTRIC METER.

No. 434,501. Patented Aug. 19, 1890.

Witnesses:
James F. Duhamel
Horace A. Dodge.

Inventor:
Jules Cauderay,
by Dodge Sons,
Attys.

(No Model.) 8 Sheets—Sheet 6.
J. CAUDERAY.
ELECTRIC METER.
No. 434,501. Patented Aug. 19, 1890.
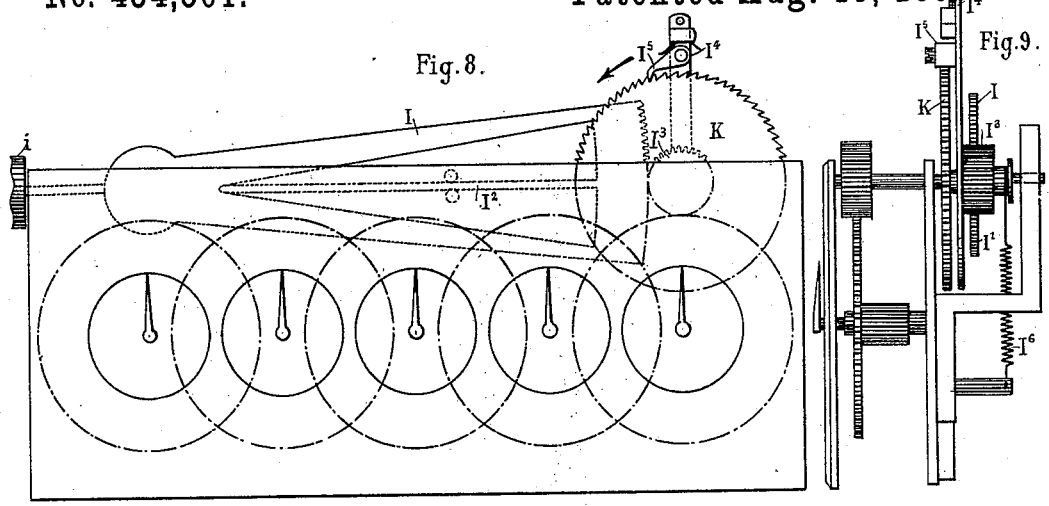
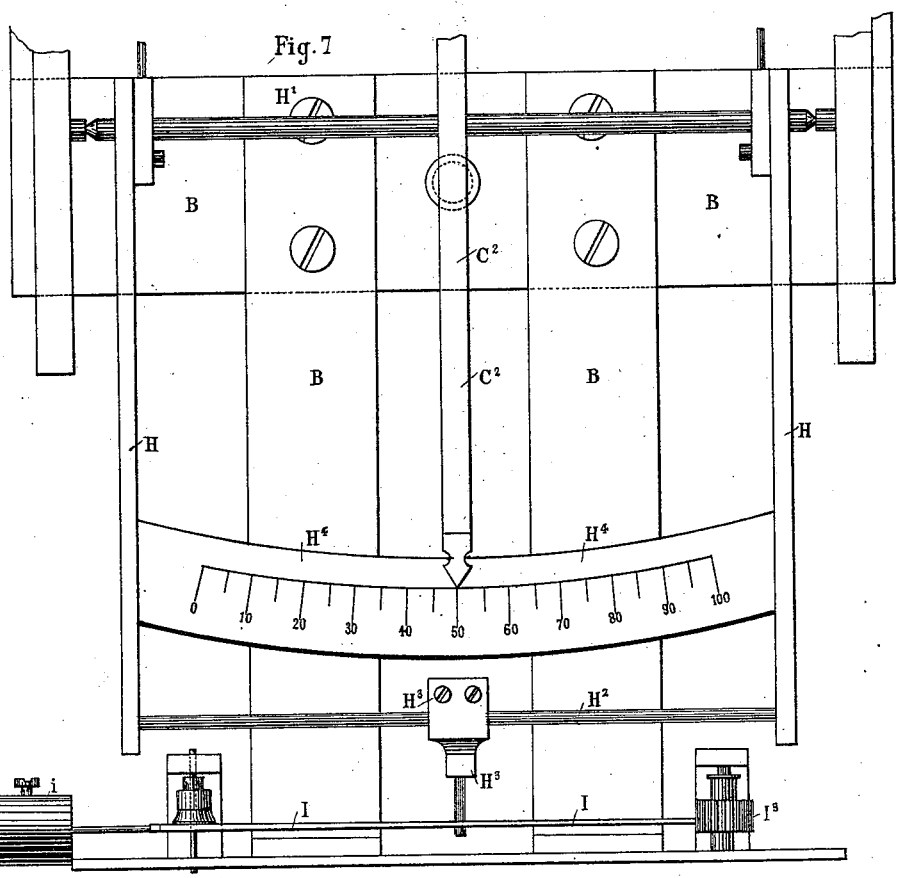
Witnesses:
James F. Duhamel
Horace A. Dodge
Inventor:
Jules Cauderay,
by Dodge Sons
Attys (No Model.) 8 Sheets—Sheet 7.

J. CAUDERAY.
ELECTRIC METER.

No. 434,501. Patented Aug. 19, 1890.

Witnesses:
James F. Duhamel.
Horace A. Dodge.

Inventor:
Jules Cauderay
by Dodge & Sons,
Attys.

(No Model.) 8 Sheets—Sheet 8.

J. CAUDERAY.
ELECTRIC METER.

No. 434,501. Patented Aug. 19, 1890.

Witnesses:
James F. Duhamel.
Horace A. Dodge.

Inventor:
Jules Cauderay,
by Dodge & Sons,
Attys.

UNITED STATES PATENT OFFICE.

JULES CAUDERAY, OF PARIS, FRANCE.

ELECTRIC METER.

SPECIFICATION forming part of Letters Patent No. 434,501, dated August 19, 1890.

Application filed August 9, 1889. Serial No. 320,276. (No model.) Patented in France December 19, 1888, No. 194,887.

*To all whom it may concern:*

Be it known that I, JULES CAUDERAY, a citizen of Switzerland, residing at 1 Avenue Laumiére, in the city of Paris, in the Republic of France, have invented certain new and useful Improvements in Apparatus for Measuring Electricity; and I do hereby declare the following to be a full, clear, and exact description of the invention, such as will enable others skilled in the art to which it appertains to make and use the same, reference being had to the accompanying drawings, and to the letters or figures of reference marked thereon, which form a part of this specification.

The present invention has for its object certain modifications applied to the meters described in my previous patents.

The present apparatus is composed of the same principal parts as my previous meters—that is, first, an amperometer or Watt meter; second, an electric or other clock-work; third, a part to effect the integration of the intensity by the time or determine the resultant amount; and, fourth, an ordinary register. The drawings attached show a meter constructed in conformity with said modification.

Figure 1:
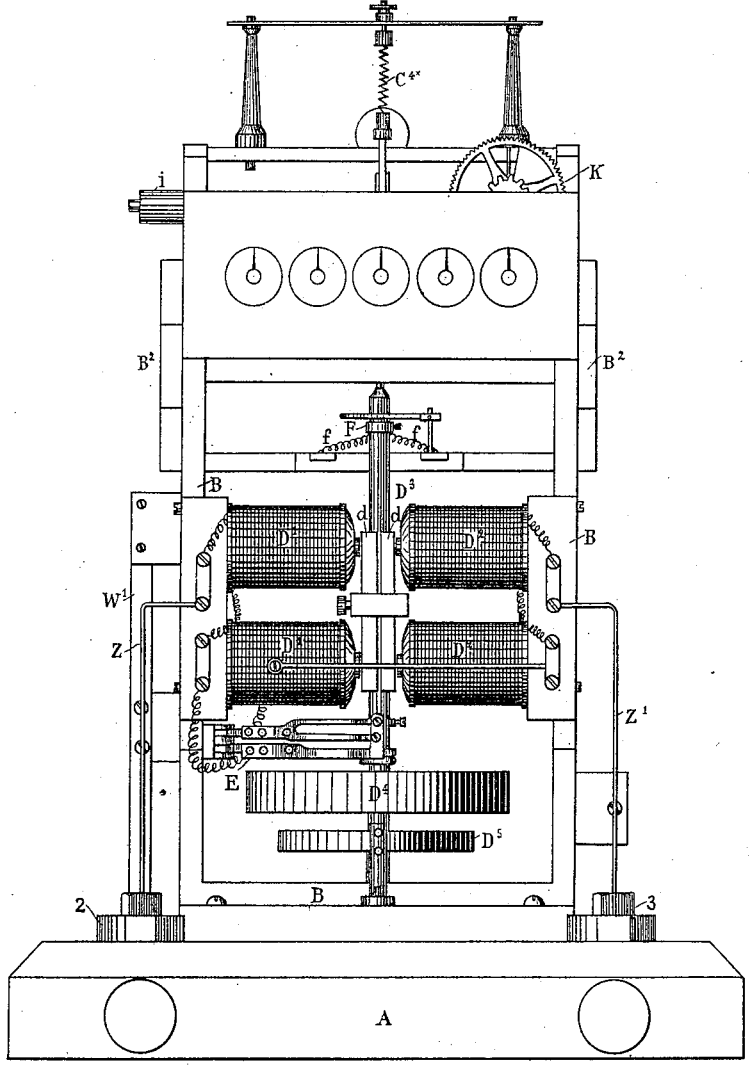
Figure 2:
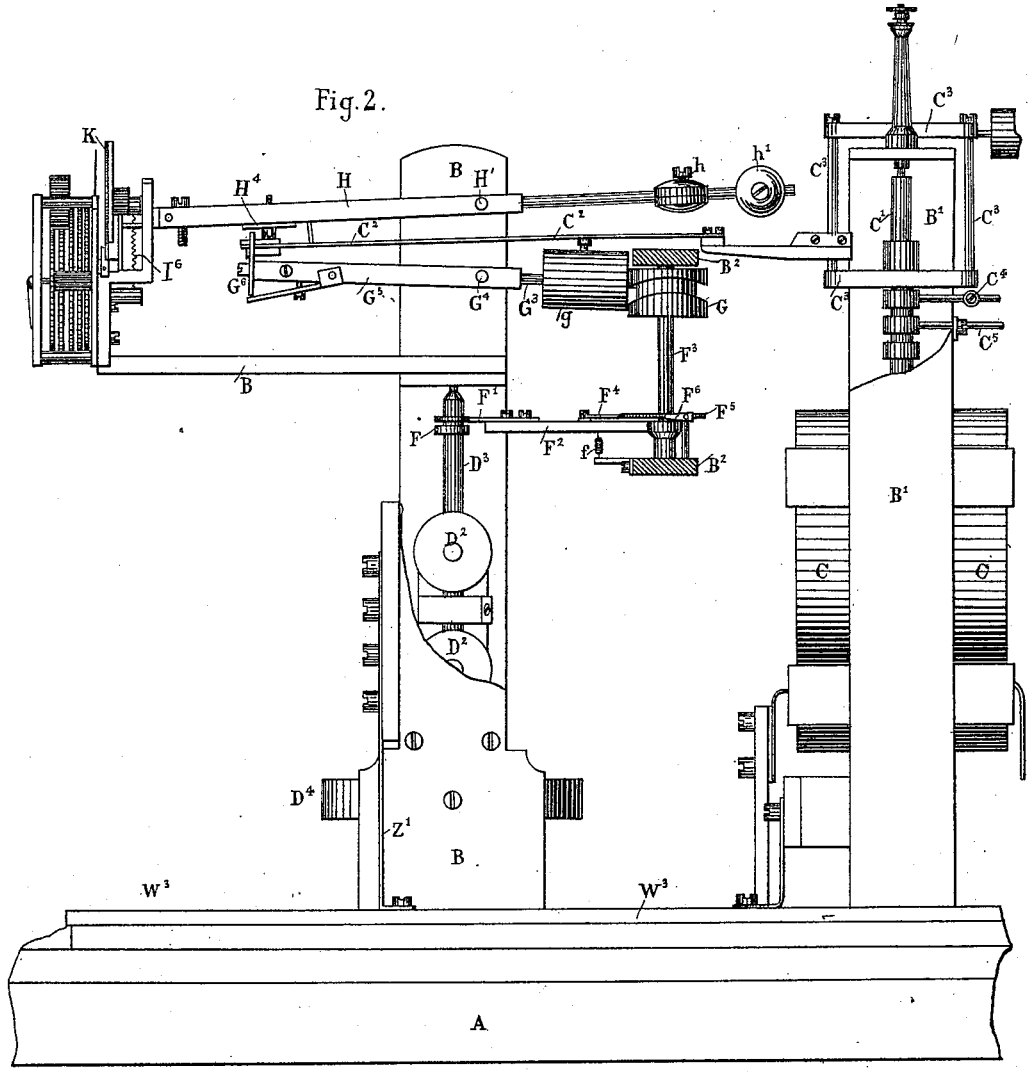
Figure 3:
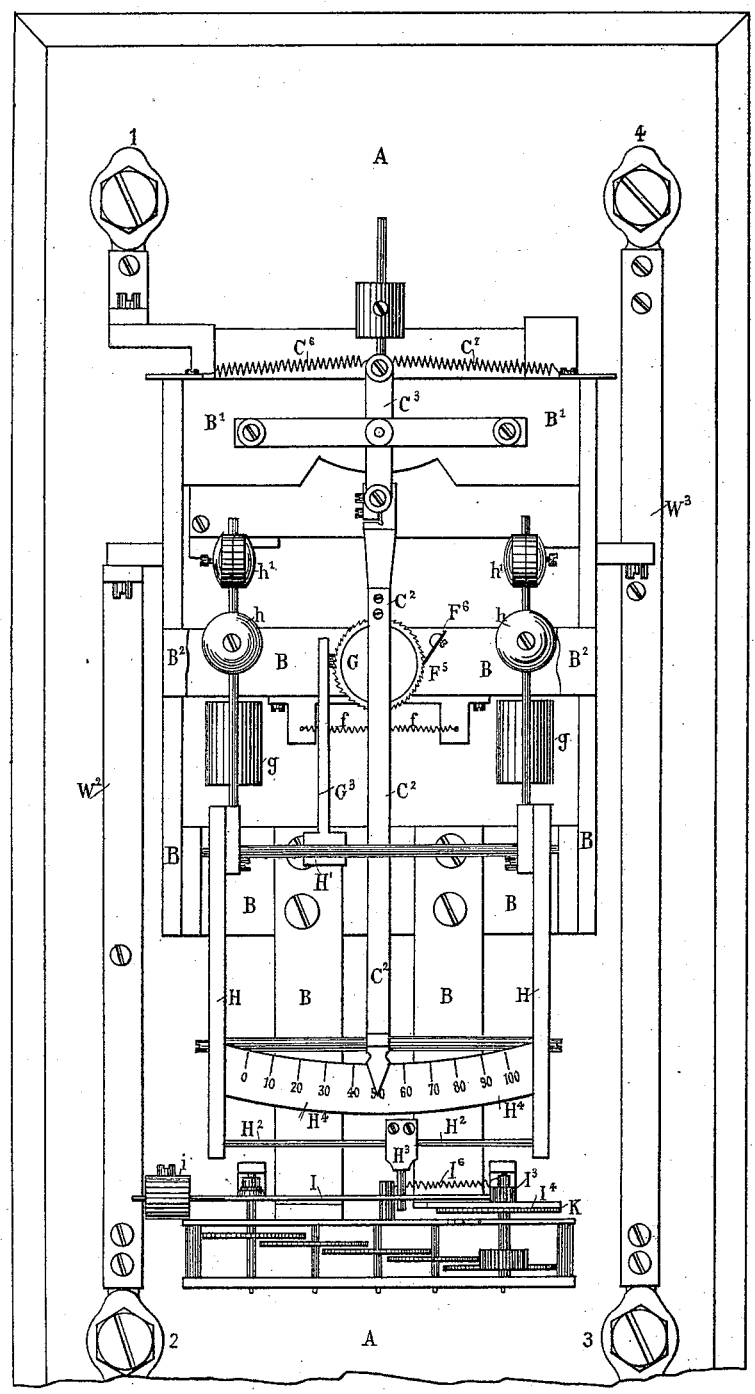
Figure 6:
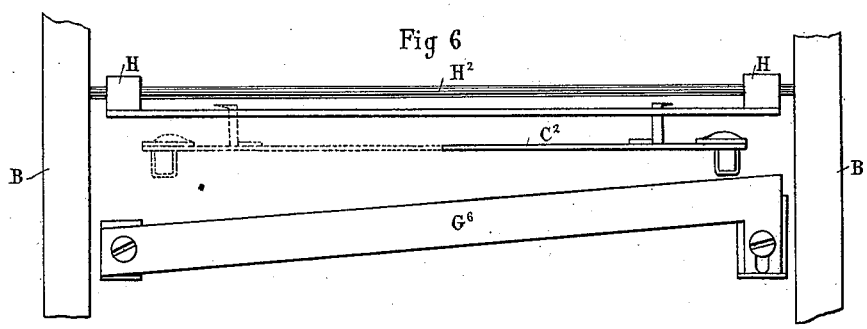
Figure 18:
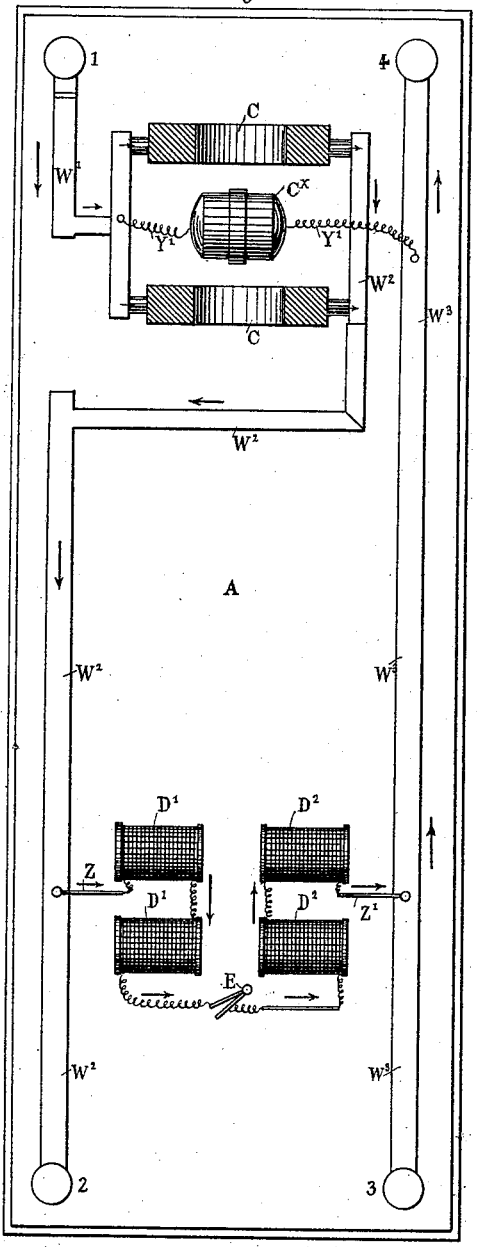

In the drawings, Figure 1 is a front view of the meter; Fig. 2, a side elevation; Fig. 3, a plan. These three figures are on the scale of one-half. Fig. 4 is a view, partly in elevation, showing the system for effecting the integration; Fig. 5, partial plan view of this system; Fig. 6, front view of the triangle controlling the needle of the amperometer; Fig. 7, partial plan view showing the movable graduated dial; Fig. 8, front view of the registering apparatus, showing the control of the ratchet; Fig. 9, side view of the register. Figs. 10 to 13 show the automatic current-interrupting regulator applied to the clock-work. Figs. 14 to 17 show modifications which I reserve the right to apply to certain parts of the apparatus. These figures are full size. Fig. 18 is a diagram showing clearly the course of the current in the apparatus.

In the figures, A is the wooden base of the apparatus on which it is mounted.

B is the frame supporting the clock-work; B', the frame in which the amperometer is mounted; $B^2$, intermediate frame carried by the frames B and B', in which are mounted the parts connecting the clock-work with the integrator.

C C are the fixed bobbins of the amperometer or Watt meter, formed of a thick conductor wound upon itself, through which passes the whole of the current to be measured. In the interior of these bobbins C C is placed a bobbin $C^x$, wound of very fine wire, mounted on the movable vertical shaft C', carrying the indicating-needle $C^2$. This shaft C' is mounted in the frame $C^3$, suspended from the spiral spring $C^{4x}$.

D' D' and $D^2$ $D^2$ are electro-magnet bobbins giving the impulse, by means of armatures d d, to the shaft $D^3$ of the clock-work. On this shaft, toward the bottom, is mounted the fly-wheel $D^4$, below which is placed the spiral-spring regulator $D^5$.

E is the automatic current-interrupting regulator, hereinafter described, and shown in the detailed view, Figs. 10 to 13.

Figure 14:
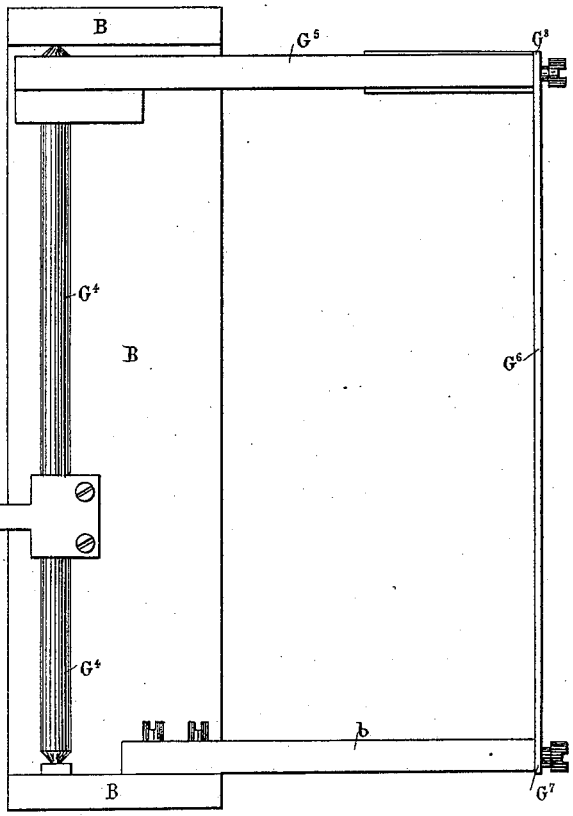
Figure 15:
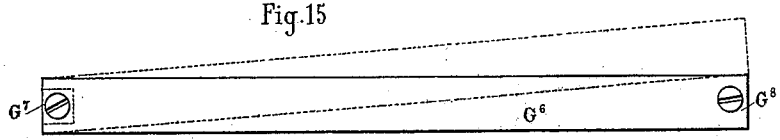
Figure 10:
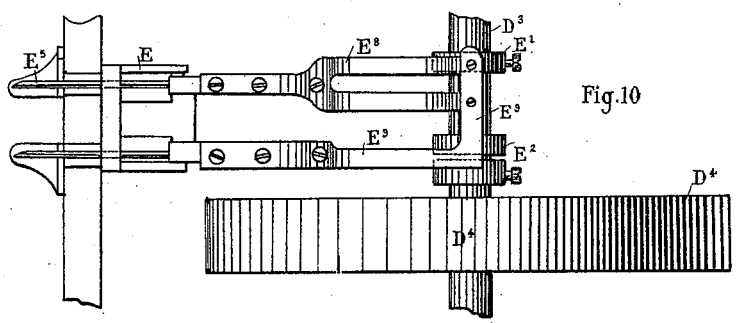
Figure 11:
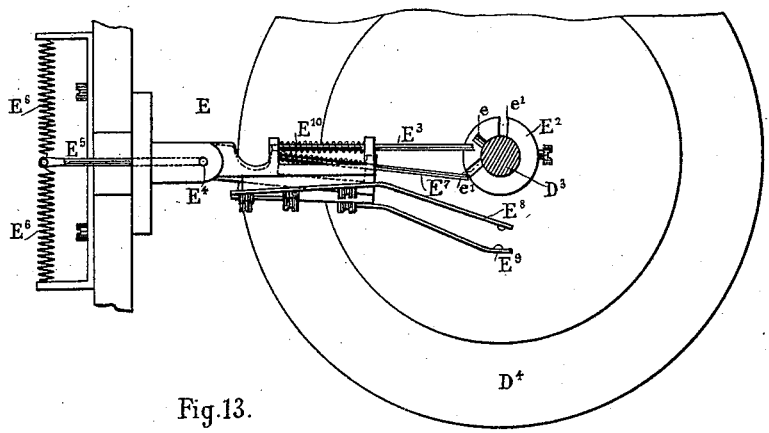
Figure 13:
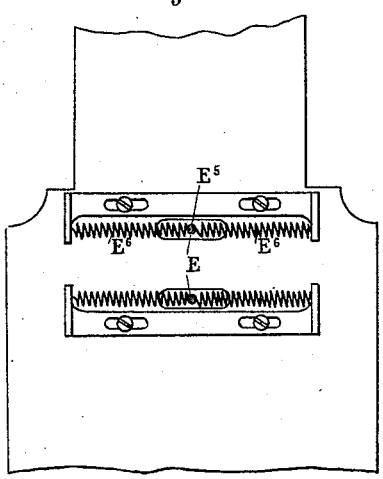
Figure 12:
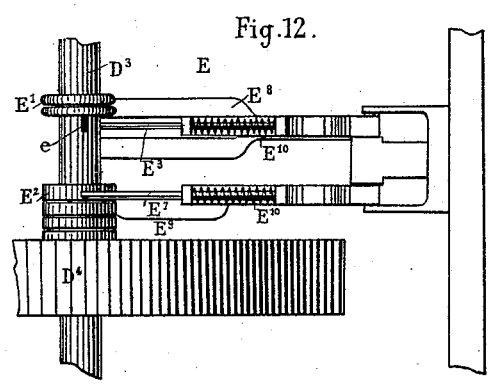

The apparatus operates as follows: Under the influence of the current, whose course is described later, and through the action of the automatic interrupter or circuit maker and breaker, the shaft $D^3$ receives an alternating motion. On this shaft $D^3$, toward the top, is placed an adjustable ring F, provided with a notch. This ring transmits its alternative motion, as seen in Fig. 2, to a steel lug F', mounted on the end of lever $F^2$, oscillating freely around the shaft $F^3$, carried on the intermediate frame $B^2$. The said lever $F^2$ bears a pawl $F^4$ controlling the ratchet-wheel $F^5$, mounted on the shaft $F^3$, to which it communicates its motion. The pawl $F^4$ acts always in the same direction on the wheel $F^5$, because it is stopped from coming backward by the catch $F^6$. The lever $F^2$ tends constantly to resume its normal position perpendicular to the shaft $D^3$ under the operation of two opposite and symmetrical springs *f f*, Figs. 1 and 3. At the top of the shaft $F^3$ is mounted a piece G, in which there is a groove, half of which forms a right-handed screw-thread and the other half a left-handed one. In this groove runs a roller G', Fig. 5, which transforms the movement of rotation into an alternating motion. This roller is mounted on the end of a small arm $G^2$, fixed perpendicularly on the lever $G^3$, which oscillates the shaft $G^4$, to which it is attached, as shown in Figs. 3, 5, and 14. On this shaft is mounted a rigidly-movable frame $G^5$, equilibrated by the counter-weights $g\ g$, which participates in the movement of the shaft. On the front of this frame is fixed adjustably a right-angled triangle $G^6$, Figs. 5 and 6, whose hypotenuse determines a vertical movement of the flexible needle $C^2$, and hence of the movable graduated dial $H^4$, Fig. 7. This movable dial $H^4$ is carried by arms $H$, which oscillate on a shaft $H'$. It is equilibrated by the counter-weights $h\ h\ h'\ h'$. These arms $H$ are united in front by a fixed rod $H^2$, which bears an adjustable fork $H^3$. The register is controlled by the toothed sector I, Figs. 7 and 8. This sector is provided with a fixed rod $I^2$, Fig. 8, controlled by the fork $H^3$. It is equilibrated by the counter-weight $i$, so as to move upon the application of very slight force. This toothed sector I controls a pinion $I^3$. This pinion carries an arm $I^4$, at the end of which is fixed a pawl $I^5$, which pushes in the direction of the arrow, Fig. 8, the ratchet-wheel $K$, the pinion $I^3$ being turned forward by a very light spiral spring $I^6$, (shown in Figs. 2, 3, and 8), one end of the spring being attached to the framework of the instrument and the other end being attached to a cord or thread wound upon a barrel or hub integral and concentric with the pinion $I^3$. Instead of this arrangement I may also use a wheel $K$ without teeth and a friction-pawl. The register is similar to those described in my previous patents and of well-known construction.

*Course of the current.*—The course of the current is clearly shown in the diagram, Fig. 18. In this particular case I have introduced into the apparatus a Watt meter instead of an amperometer. C C are the outside fixed bobbins of the Watt meter wound of a conductor of large section, into which passes the whole current to be measured, and $C^x$ is the movable interior bobbin of fine wire, into which passes a derived current proportional to the electro-motive force of the current to be measured. The current enters the apparatus by the clamp-screw 1, follows the conductor $W^7$, divides itself between and traverses the bobbins C C, and comes out by the conductor $W^2$, which ends at the clamp-screw 2, whence it goes where it is to be used, (lamps, &c.) It comes back again into the apparatus by the clamp-screw 3, follows the conductor $W^3$, and goes out by the clamp-screw 4. Fig. 18 shows the way in which the attachment of the wires might be interchanged according to requirements. The bobbin of fine wire $C^x$ is traversed by a derivation $Y'$ of the current branching from the conductor $W'$. The current comes out by the wire $Y'$ branching from the conductor $W^3$. Another derivation of the current operates the clock-work. It starts at Z on the conductor $W^2$, traverses the bobbins $D'\ D'$, the interrupter E, the bobbins $D^2\ D^2$, and comes out by the wire $Z'$ into the conductor $W^3$. The automatic interrupter is shown in Figs. 10 to 13. On the shaft $D^3$ are mounted two rings $E'\ E^3$. The ring $E'$ bears at the bottom a small tongue $e$, which at each oscillation in either direction pushes a lever $E^3$, arranged to slide longitudinally through a block or carrier pivoted at $E^4$. This block or carrier is provided at the rear end with a rod $E^5$, attached by the end to the two opposing springs $E^6\ E^6$, which at each oscillation bring back the lever to its normal position. The ring $E^2$ is provided with two notches $e'\ e'$, so arranged that according to the amplitude of the oscillation of the shaft $D^3$ they do or do not push away the lever $E^7$. These levers $E^3$ and $E^7$ carry strips of steel insulated from the levers $E^8$ and $E^9$, but connected by flexible wires to the electro-magnets, Fig. 1, and these strips are provided with contacts. According to the arrangement of the pieces and the amplitude of the oscillations contacts are produced or not, so as to keep up a regular motion of the balance-wheel D. The two levers $E^3$ and $E^7$ are identical in construction. The springs $E^{10}$ are designed to allow the levers $E^3$ and $E^7$ to come back by sliding in the support when the lever and the tongue $e$ happen to be in the same line. The strip $E^8$ is double or fork-shaped. Its ends are each provided with a contact whose counterpart is found upon the strip $E^9$. The object of this arrangement is always to have one of the contacts in operation, the spark being produced always at the same point. When there is a stoppage of the apparatus from a cessation of the current, it is needless to say that the contacts touch, so that as soon as the current again traverses the apparatus the latter at once starts.

*Registration of the current.*—The fly-wheel $D^4$, under the influence of the electro-magnets $D'\ D'$ and $D^2\ D^2$, as well as of the spiral regulator $D^5$, makes exactly one oscillation a second. Consequently the lever $F^2$, by means of the pawl $F^4$, advances the ratchet-wheel $F^5$ one tooth a second. This wheel having sixty teeth makes one revolution a minute, as does also the piece G. By reason of the arrangement of the groove on that piece, the movable frame $G^5$ and the triangle $G^6$ makes one double oscillation a minute. The needle $C^2$ moves under the influence of the current to be measured along the dial $H^4$ from 0 to 100 divisions. The hypotenuse of the triangle $G^6$ in its alternating motion strikes the needle $C^2$, which is raised a distance proportional to its deviation. This needle lifts the movable frame H, and thus by means of the fork $H^3$ the toothed sector I. The sector controlling the pinion $I^3$ advances the wheel $K$ an amount proportional to the deviation of the needle $C^2$—that is to say, proportional to the intensity or to the energy of the current, according as it is an amperometer or a Watt meter that is used.

Figs. 14, 15, 16, and 17 represent certain of the modifications that I may apply to certain parts of the apparatus.

The triangle G⁶, Figs. 4, 5, and 6, moves parallel to itself, being fixed rigidly to the ends of the arms G⁵. I may also adopt the arrangement shown in Figs. 14 and 15, which consists of jointing by one end at G⁷ the piece G⁶ upon the arm b, fixed rigidly to the frame B, while the other end G⁸ is controlled by the oscillating arm G⁵. The effect produced on the needle C² is the same whichever of these arrangements I use; but with the latter the action on the needle continues, while with the arrangement shown in Figs. 4, 5, and 6 the pushes on the needle C² vary in duration according to the position of the needle, which causes sudden movements in the register.

Figs. 16 and 17 show an arrangement simplifying the arrangement of the register.

I suppress the toothed sector I, Figs. 7 and 8, as well as the fork H³, and I replace them by a rack L, mounted on the arm H of the movable frame. This rack operates the pinion I³ directly.

Figs. 2 and 3 show an improvement in the construction of the Watt meter to render the deviation of the needle exactly proportional to the electrical energy passing through the apparatus. I mount upon the shaft of the needle two radial arms C⁴ and C⁵, which may be each placed in any suitable position, or at any desired angle. To these arms are attached adjustably two spiral springs C⁶ C⁷, fixed by one end to the frame of the apparatus.

I do not intend to limit myself exactly to all the details of construction described in the present application, which may be varied without changing the principle of the apparatus; but

I claim as my invention—

1. In an electric meter and register, the combination of an electric measuring device—such as a Watt meter, amperometer, or the like—and a time-measuring device, an integrator or device, substantially such as described and shown, for determining the resultant or product of the current passing and the time during which it passes, and a register for recording such resultant or product, the integrator and the register both being controlled and actuated by the one time-measuring device.

2. In an electric meter, the combination of an electric measuring device—such as a Watt meter, amperometer, or the like—a time-measuring device, a movable frame provided with a bar or plate having an inclined or oblique edge directly beneath or back of the indicator-arm of the meter, means, substantially such as described and shown, for transmitting motion from the time mechanism to said movable frame, a register, and an actuating-lever for imparting motion to said register, bearing upon and controlled as to the amplitude of its movements by said indicator-arm.

3. In an apparatus for measuring and recording the flow of an electric current, the combination of a time-measuring instrument, a frame or lever connected therewith and adapted to be reciprocated or oscillated thereby, a bar carried by said frame or lever and having its edge arranged obliquely to the pivotal axis of the frame, a current-meter—such as a Watt meter, amperometer, or the like—having an axis of movement perpendicular to that of said frame or lever, and having its indicator-arm arranged to play over or opposite the oblique edge of said bar, a register, and a lever interposed between the register and the indicator-arm of the meter, moved and controlled as to the amplitude of its movements by said indicator-arm and the oblique bar, substantially as set forth and shown.

4. In combination with the balance-staff of a time-measuring instrument and with a cam thereon, a pivoted frame or lever having an arm in engagement with said cam and bearing a bar, one edge of which is oblique to the axis about which the frame or lever swings, a current-meter, the indicator-arm of which moves normally in a plane parallel with said axis, a register, and a lever for actuating said register, the indicator-arm being arranged to play between the oblique edge of the bar and the actuating-lever, substantially as described and shown, whereby it is made to determine the movement of said lever, and thus render the movements of the register precisely proportional to the varying positions of the indicator.

5. In a current-measuring apparatus, the combination of a balance-staff D³, provided with rings E′ and E², the former having a stud e and the latter provided with openings e′ e′, rods or levers E³ and E⁷, arranged to slide longitudinally and provided with springs E¹⁰ for urging them toward the rings, insulated arms E⁸ E⁹, provided with contact-points, and springs E⁶ E⁶, applied to the levers E³ and E⁷ and serving to maintain them normally in proper relation to the staff D³.

6. In combination with a current-meter having a needle or indicator-arm adapted to be deflected by the current, a time-measuring device, a register, a lever or frame overhanging the needle or indicator-arm and serving to actuate the register, a lever beneath the needle or indicator-arm provided with an oblique bar over which the needle or indicator-arm swings, and means, substantially such as described and shown, for transmitting motion from the time-measuring device to the lever beneath the needle or indicator-arm, whereby said lever is raised and lowered and is caused to raise the needle or indicator-arm and the lever above it a distance exactly proportionate to the deflection of the needle.

7. In a current-meter, substantially such as described, the combination of a needle or indicator-arm, which is arranged to be deflected by the current, with arms $C^4$ and $C^5$, independently and adjustably secured to the shaft or spindle carrying the needle, and springs $C^6$ $C^7$, attached to the respective arms and to fixed supports.

In testimony whereof I affix my signature in presence of two witnesses.

JULES CAUDERAY.

Witnesses:
   G. DE MESTRAL,
   J. L. RATHBONE.